United States Patent [19]
Southwell

[11] Patent Number: 5,181,143
[45] Date of Patent: Jan. 19, 1993

[54] MULTIPLE LINE RUGATE FILTER WITH INDEX CLIPPING

[75] Inventor: William H. Southwell, Thousand Oaks, Calif.

[73] Assignee: Rockwell International Corporation, Seal Beach, Calif.

[21] Appl. No.: 770,802

[22] Filed: Oct. 3, 1991

[51] Int. Cl.[5] .......................... G02B 5/28; B05D 5/06
[52] U.S. Cl. .................... 359/586; 359/589; 427/162
[58] Field of Search ....................... 359/586, 588, 589; 427/162

[56] References Cited

U.S. PATENT DOCUMENTS

| | | | |
|---|---|---|---|
| 4,583,822 | 4/1986 | Southwell | 359/586 |
| 4,707,611 | 11/1987 | Southwell . | |
| 4,778,251 | 10/1988 | Hall et al. . | |
| 4,826,267 | 5/1989 | Hall et al. | 359/586 |
| 4,925,259 | 5/1990 | Emmett | 359/589 |
| 4,934,788 | 6/1990 | Southwell . | |
| 4,952,025 | 8/1990 | Gunning, III . | |
| 4,968,117 | 11/1990 | Chern et al. | 359/589 |
| 5,000,575 | 3/1991 | Southwell et al. . | |
| 5,004,308 | 4/1991 | Hall et al. | 359/589 |
| 5,009,485 | 4/1991 | Hall | 359/586 |

*Primary Examiner*—Martin Lerner
*Attorney, Agent, or Firm*—John C. McFarren

[57] ABSTRACT

A gradient index codeposition process involving refractive index clipping is used to fabricate rugate filters having multiple reflectance bands. During the codeposition process, whenever the superimposed sine wave profiles extend beyond either the upper or lower refractive index limits of the optical materials involved. the index is held at its bound (i.e., clipped). A rugate filter having a multiplicity of stop bands can be fabricated using a rather limited range of refractive index excursions during the codeposition process. Loss of optical density from index clipping can be corrected by a compensating increase in filter thickness.

10 Claims, 1 Drawing Sheet

MULTIPLE LINE RUGATE FILTER WITH INDEX CLIPPING

GOVERNMENT RIGHTS

The United States Government has rights in this invention under contract number F33615-86-C-5051 awarded by the Department of the Air Force.

TECHNICAL FIELD

The present invention relates to gradient index thin films and, in particular, to rugate filters having multiple stop bands produced by refractive index clipping.

BACKGROUND OF THE INVENTION

Great improvements in optical coating technology have been achieved through the introduction of multiple layer films. In fabricating multiple layer films, two different materials are typically used—one with a relatively high index of refraction and the other with a relatively low index of refraction. The two materials are alternately deposited in a controlled sequence of thicknesses to obtain the desired optical characteristics for the film. The deposition process is typically controlled by monitoring the thickness of each layer as it is deposited and by terminating the deposition when the layer reaches the correct thickness. This approach provides the flexibility to design a wide range of multiple layer interference coatings for various transmission and reflection spectra. The result is the addition of complex spectral filter structures to many new optical devices. Antireflection coatings, laser dielectric mirrors, television camera edge filters, optical bandpass filters, and band-rejection filters are some of the examples of useful devices employing multilayer thin film interference coatings.

Some advanced applications of optical technology, however, have performance requirements that exceed the capabilities of multiple layer thin films. New optical design procedures have been developed for these advanced applications to predict the continuous refractive index profile required for any desired transmission or reflection spectrum, including multiple reflectance bands. These design techniques employ gradient index layers, in which the index of refraction varies continuously as a function of depth into the layer. Gradient index optical coatings have advantages over conventional technologies, including flexibility in filter design and increased stability in adverse environments.

One type of gradient index structure is the rugate filter, the simplest manifestation of which has a periodic refractive index that varies sinusoidally with respect to optical thickness. A rugate filter is a gradient index analog of a quarterwave stack reflector. Compared to a quaterwave stack, however, a rugate filter has greatly suppressed high-frequency reflection harmonics. A rugate filter can provide high reflectivity within a narrow bandwidth simply by increasing the number of periods in the filter.

In the past, practical realizations of the rugate and other gradient index structures were inhibited by the limitations of thin film fabrication technology. However, improved methods of monitoring and controlling the deposition of optical thin films, including gradient index films, have greatly advanced the technology of rugate filters having continuous refractive index profiles. Background information regarding this technology can be found in the following patents, which are hereby incorporated by reference: U.S. Pat. No. 4,707,611 issued to Southwell for "Incremental Monitoring of Thin Films"; U.S. Pat. No. 4,778,251 issued to Hall et al. for "Thickness Error Compensation for Digital Gradient-Index Optical Coatings"; U.S. Pat. No. 4,934,788 issued to Southwell for "Deposition of Gradient Index Coatings using Coevaporation with Rate Control"; U.S. Pat. No. 4,952,025 issued to Gunning, III for "Rugate Filter Incorporating Parallel and Series Addition"; and U.S. Pat. No. 5,000,575 issued to Southwell et al. for "Method of Fabricating Gradient Index Optical Films."

A remarkable feature of gradient index optical filters is that sinusoidal index variations may be superimposed (i.e., added) to produce multiple rejection bands (also referred to as lines, reflectance bands, or stop bands) with a filter having the same thickness as required for a single rejection band. However, it has been thought that the number of stop bands or lines producible in a rugate filter is limited by the range of the refractive index material available for the deposition process used to fabricate the filter. As more sinusoidal variations are superimposed, the resulting variation profile can greatly exceed the refractive index range producible by available materials. Thus, there is a need for a method of fabricating gradient index optical films having multiple stop bands using currently available deposition materials.

SUMMARY OF THE INVENTION

A rugate filter having a single reflectance band at a desired wavelength can be fabricated using a codeposition process to produce an optical film having a sinusoidal refractive index profile. A rugate filter of the same thickness having multiple stop bands can be produced by superimposing multiple sine wave index profiles during the codeposition process. In the case of a filter having N stop bands, N sine wave profiles must be added. At the extreme, when all N sine waves are momentarily in phase, the total refractive index variation is N times that for a single sine wave profile. When N is large, the refractive index variation required to produce the multiple stop bands can greatly exceed the refractive index limits of the optical materials used in the codeposition process.

The present invention comprises a method of fabricating rugate filters having multiple stop bands by a process of index clipping. During the codeposition process, whenever the superimposed sine wave profiles exceed either the upper or lower refractive index limits of the optical materials involved, the index is held at its bound (i.e., clipped). It has been discovered that a multiple stop band filter can be fabricated using rather severe refractive index clipping. As a result, a rugate filter having a large number of stop bands can be fabricated using a rather limited range of refractive index excursions during a gradient index codeposition process. Index clipping does result in a loss of optical density, but this can be corrected by a compensating increase in the thickness of the filter.

A principal object of the invention is the production of gradient index optical films having multiple reflectance bands. A feature of the invention is a process of refractive index clipping during codeposition of optical materials. An advantage of the invention is the production of rugate filters having a multiplicity of stop bands using conventional optical materials.

BRIEF DESCRIPTION OF THE DRAWINGS

For a more complete understanding of the present invention and for further advantages thereof, the following Detailed Description of the Preferred Embodiment makes reference to the accompanying drawings, in which.

DETAILED DESCRIPTION OF THE PREFERRED EMBODIMENT

A remarkable feature of optical interference filters having gradient refractive index profiles is that sinusoidal index variations can be superimposed to produce multiple rejection bands within the same filter thickness. Thus, a two or three line (also referred to as a rejection band, stop band, or reflectance band) rugate filter having a given optical density (OD) is approximately the same thickness as a rugate filter having only a single stop band.

The range of refractive index variation obtainable in a codeposition thin film process is bounded by the optical characteristics of the materials used. When coevaporating two materials, the refractive index of the deposited material cannot exceed the index of the higher index material nor can it be less than the index of the lower index material. Originally it was thought that the number of sine wave profiles that could be superimposed (added) to produce a rugate having multiple stop bands was limited by the bounds of the refractive index achievable in the codeposition process. The refractive index distribution as a function of optical thickness for an N-line rugate filter is given by:

$$n = n_a + 0.5 \Sigma n_{pi} \sin(490\, O/\lambda_i),$$

where $n_a$ is the average index, $n_{pi}$ is the peak-to-peak index amplitude for the rugate line at wavelength $\lambda_i$, and $O$ is the optical thickness. The summation is over $i$ from 1 to N, the number of rugate lines (i.e., stop bands). In the extreme case of superimposed sine wave profiles, all refractive index cycles could be momentarily in phase, resulting in a total refractive index variation of:

$$\delta n = n_p N,$$

assuming all lines have the same peak-to-peak index amplitude ($N_p$). When N is large, the total index variation exceeds the practical refractive index range, which is determined by the optical characteristics of the materials involved in the codeposition process.

Figure 1:
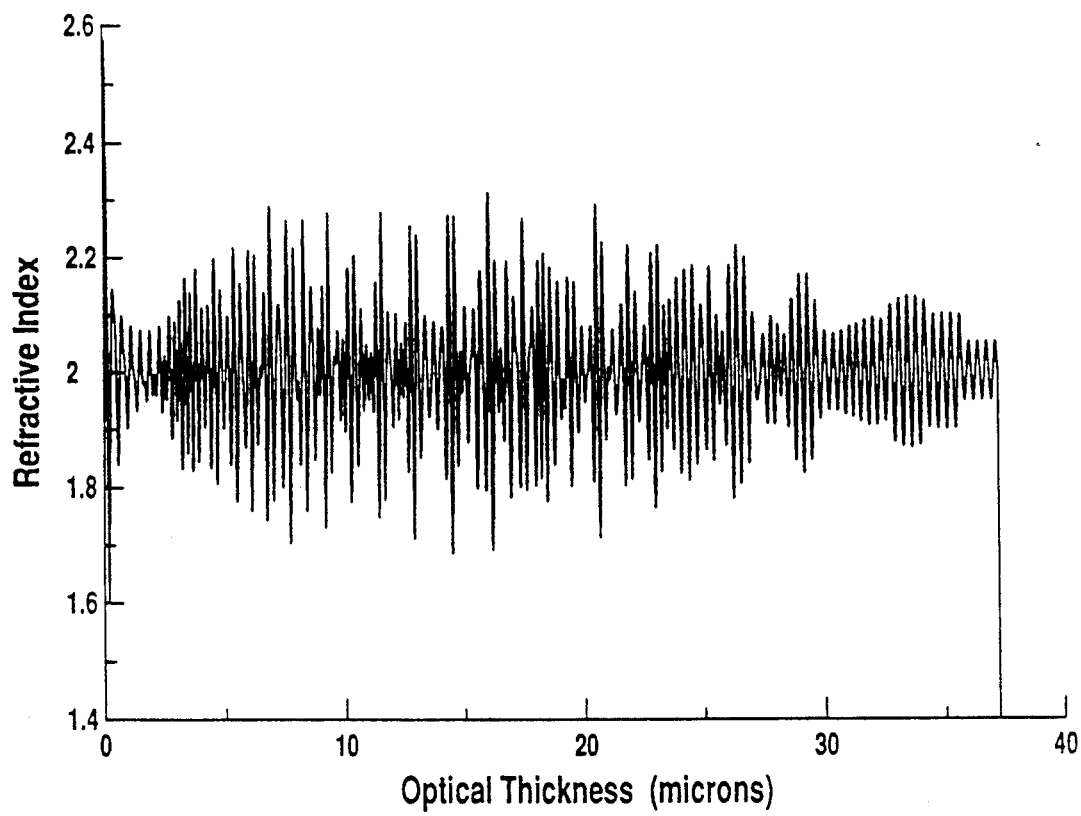
FIG. 1 is a superimposed refractive index profile for a 12-line rugate filter with the profile for each line having an average index of 2.0 and an amplitude of 0.1.

An example of a superimposed refractive index profile for a 12-line rugate filter is shown in FIG. 1. In this example, the average index ($n_a$) is 2.0 with the sine wave for each of the 12 lines having a peak-to-peak amplitude ($n_p$) of 0.1. This requires a maximum refractive index variation of 1.2 (i.e., 12×0.1), which is a maximum excursion of ±0.6 around the average index of 2.0. The superimposed profile of FIG. 1 is for 100.5 cycles for each of the 12 lines, with an average optical density (OD) of 3.0 for each line. This profile results in 12 stop bands (lines) approximately evenly spaced in wavelength from 0.4 to 0.75 microns. Each line was given the same $n_p$ and the same number of cycles so that each would have the same OD. FIG. 1 shows that very little of the superimposed refractive index profile extends beyond half of the mathematically possible maximum excursion.

Figure 2:
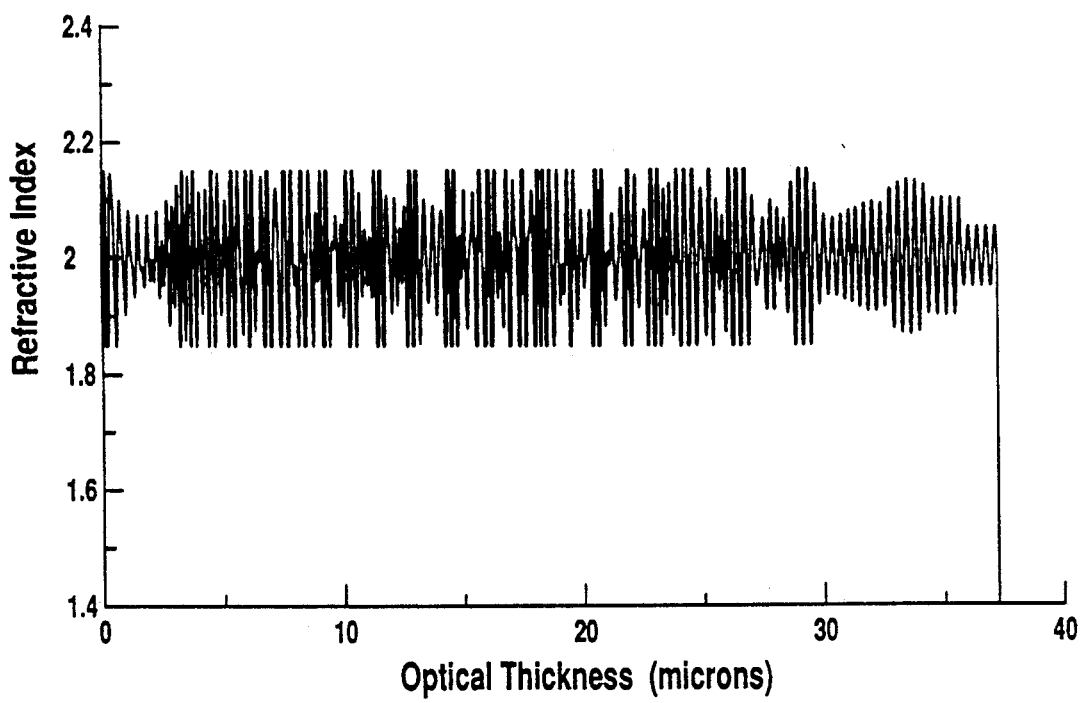
FIG. 2 is the superimposed refractive index profile for the 12-line rugate filter of FIG. 1 except that hard clipping is imposed above 2.15 and below 1.85.

FIG. 2 shows the same superimposed 12-line profile as FIG. 1 except that the refractive index excursions are clipped at 75% of the full index excursion. Thus, when the summation indicated a refractive index less than 1.85 or greater than 2.15, the index was held at these limiting values. As illustrated in FIG. 2, the 75% clipping affects nearly the entire profile. When tested, it was found that the rugate fabricated with index clipping maintained all the desired stop bands at their correct spectral location. The average loss in optical density for this example was 0.65 (i.e., to 2.35). This loss in OD can be restored by simply extending the thickness of the filter by approximately 28%.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

I claim:

1. A method of making a gradient index thin film having a plurality of reflectance bands, comprising the steps of:
   determining a thin film refractive index profile corresponding to each of the plurality of reflectance bands;
   summing the plurality of refractive index profiles in parallel to produce a superimposed refractive index profile;
   determining upper and lower refractive index limits of optical material to be deposited, said superimposed refractive index profile having peak-to-peak amplitude variations exceeding said upper and lower refractive index limits; and
   depositing a film of said optical material having an actual refractive index profile corresponding to said superimposed refractive index profile bounded by said upper and lower limits.

2. The method of claim 1, wherein said step of depositing optical material further comprises the steps of:
   selecting a first optical material having a high index of refraction;
   selecting a second optical material having a low index of refraction; and
   codepositing said first and second materials in proportions necessary to produce said actual refractive index profile.

3. The method of claim 2, wherein said step of determining said upper and lower refractive index limits further comprises the steps of:
   determining said upper limit based on the index of refraction of said first optical material; and
   determining said lower limit based on the index of refraction of said second optical material.

4. The method of claim 3, wherein said step of codepositing optical materials further comprises the steps of:
   holding said actual refractive index at said upper limit whenever said superimposed refractive index profile exceeds said upper limit; and
   holding said actual refractive index at said lower limit whenever said superimposed refractive index profile is less than said lower limit.

5. A method of making a rugate filter having a plurality of stop bands, comprising the steps of:
  determining a thin film refractive index profile corresponding to each of the plurality of stop bands;
  summing the plurality of refractive index profiles in parallel to produce a superimposed refractive index profile;
  determining upper and lower refractive index limits based on optical characteristics of materials to be codeposited, said superimposed refractive index profile having peak-to-peak amplitude variations exceeding said upper and lower refractive index limits; and
  codepositing a film of said optical materials, said film forming a rugate filter having an actual refractive index profile corresponding to said superimposed refractive index profile clipped at said upper and lower limits.

6. The method of claim 5, wherein said step of codepositing optical material further comprises the steps of:
  selecting a first optical material having a high index of refraction;
  selecting a second optical material having a low index of refraction; and
  codepositing said first and second materials in proportions necessary to produce said actual refractive index profile.

7. The method of claim 6, wherein said step of codepositing optical materials further comprises the steps of:
  holding said actual refractive index at said upper limit whenever said superimposed refractive index profile exceeds said upper limit; and
  holding said actual refractive index at said lower limit whenever said superimposed refractive index profile is less than said lower limit.

8. A rugate filter having multiple reflectance bands, comprising:
  a thin film comprising a first optical material producing an upper refractive index limit codeposited with a second optical material producing a lower refractive index limit;
  said thin film having a gradient refractive index profile derived from a parallel sum of individual refractive index profiles required to produce each of the multiple reflectance bands, said parallel sum having peak-to-peak amplitude variations exceeding said upper and lower refractive index limits; and
  said gradient refractive index profile having upper and lower refractive index excursions bounded by said upper and lower refractive index limits.

9. The rugate filter of claim 8, wherein said bounded gradient refractive index profile comprises said parallel sum of said individual refractive index profiles clipped at said upper and lower refractive index limits.

10. The rugate filter of claim 9, wherein said gradient refractive index profile is held at said upper limit whenever said parallel sum is more than said upper limit and is held at said lower limit whenever said parallel sum is less than said lower limit.

* * * * *

UNITED STATES PATENT AND TRADEMARK OFFICE
CERTIFICATE OF CORRECTION

PATENT NO.   : 5,181,143
DATED        : January 19, 1993
INVENTOR(S)  : William H. Southwell It is certified that error appears in the above-identified patent and that said Letters Patent is hereby corrected as shown below:

The equation at column 3, line 40 should read as follows:

$$n = n_a + 0.5 \sum n_{pi} \sin(4\pi O/\lambda_i),$$

Signed and Sealed this

Sixteenth Day of November, 1993

Attest:

BRUCE LEHMAN

*Attesting Officer*      *Commissioner of Patents and Trademarks*